(12) United States Patent
Huang et al.

(10) Patent No.: US 7,870,302 B2
(45) Date of Patent: Jan. 11, 2011

(54) METHOD FOR AUTOMATICALLY IDENTIFYING AN OPERATING SYSTEM FOR A USB DEVICE

(75) Inventors: Chun Wei Huang, Hsinchu (TW); Chi-Chun Chu, Hsinchu (TW)

(73) Assignee: Sunplus Innovation Technology Inc., Hsinchu (TW)

( * ) Notice: Subject to any disclaimer, the term of this patent is extended or adjusted under 35 U.S.C. 154(b) by 225 days.

(21) Appl. No.: 12/222,609

(22) Filed: Aug. 13, 2008

(65) Prior Publication Data

US 2009/0248907 A1 Oct. 1, 2009

(30) Foreign Application Priority Data

Apr. 1, 2008 (TW) .............................. 97111879 A

(51) Int. Cl.
*G06F 3/00* (2006.01)
*G06F 13/00* (2006.01)
(52) U.S. Cl. ................... 710/8; 710/15; 710/31
(58) Field of Classification Search ........................ None
See application file for complete search history.

(56) References Cited

U.S. PATENT DOCUMENTS

2002/0083228 A1* 6/2002 Chiloyan et al. ............... 710/9
2010/0030922 A1* 2/2010 Lee ............................ 710/10

OTHER PUBLICATIONS

USB 2.0 Specification, USB.org [Online], Apr. 27, 2000 [accessed Nov. 5, 2010], URL: http://www.usb.org/developers/docs.*

* cited by examiner

*Primary Examiner*—Tariq R. Hafiz
*Assistant Examiner*—Scott Sun
(74) *Attorney, Agent, or Firm*—Bacon & Thomas, PLLC

(57) ABSTRACT

A method for automatically identifying an operating system for a USB device begins at initializing the USB device, and recording USB commands sent from the operating system. The USB device determines the operating system as a first operating system when there are two successive USB commands of Get Product String, there is one USB command of Get Vender String, there is no USB command of Reset ahead of a USB command of Set Address, there is no USB command of Get Language ID, or there is no USB command of Set Feature Report. The USB device determines the operating system as a second operating system when there is no USB command of Get Vender String, there are two USB commands of Get Language ID and two USB commands of Get Product String, there is one USB command of Get Device Descriptor following a USB command of Get Product String, or there is one USB command of Set Interface Report.

5 Claims, 4 Drawing Sheets

| Operating system USB commands | Windows | MAC OS X | Linux |
|---|---|---|---|
| 1. GET Device Descriptor | ◎ | ◎ | ◎ |
| 2. Reset | ◎ | ✕ | ◎ |
| 3. SET Address | ◎ | ◎ | ◎ |
| 4. GET Device Descriptor | ◎ | ◎ | ◎ |
| 5. GET Product String | ✕ | ◎ | ✕ |
| 6. GET Product String | ✕ | ◎ | ✕ |
| 7. GET Vender String | ✕ | ◎ | ✕ |
| 8. GET Configuration Descriptor | ◎ | ◎ | ◎ |
| 9. GET 4 Descriptors | ◎ | ◎ | ◎ |
| 10. GET Language ID | ◎ | ✕ | ◎ |
| 11. GET Product String | ◎ | ✕ | ◎ |
| 12. GET Vender String | ✕ | ✕ | ◎ |
| 12. GET Language ID | ◎ | ✕ | ✕ |
| 13. GET Product String | ◎ | ✕ | ✕ |
| 14. GET Device Descriptor | ◎ | ✕ | ✕ |
| 15. GET Configuration Descriptor | ◎ | ✕ | ✕ |
| 16. GET 4 Descriptor | ◎ | ◎ | ✕ |
| 17. SET New Configuration | ◎ | ◎ | ◎ |
| 18. SET Feature Report | ◎ | ✕ | ◎ |
| 19. GET HID Report Descriptor | ◎ | ◎ | ◎ |
| 20. GET Vender String | ✕ | ◎ | ✕ |
| 21. GET Product String | ✕ | ◎ | ✕ |
| 22. GET Product String | ✕ | ◎ | ✕ |
| 23. GET Feature Report | ✕ | ✕ | ◎ |
| 24. GET Feature Report | ✕ | ✕ | ◎ |
| 25. GET Feature Report | ✕ | ✕ | ◎ |
| 26. SET Interface Report | ◎ | ✕ | ✕ |

FIG. 2

| Windows | MAC OS X | Linux |
|---|---|---|
| 1. No Vender ID query (i.e., no Get Vender ID command).<br>2. There are two successive sets of Language ID and Product String queries.<br>3. There is one Device Descriptor query following the Product String query.<br>4. Set Interface Report numbered 26 in FIG. 2 is output.<br>5. Set Interface Report numbered 26 in FIG. 2 is output four times in Windows 2000. | 1. There is no Reset ahead of Set Address.<br>2. No Language ID query.<br>3. There are two successive Get Product String.<br>4. No Set Feature Report numbered 18 in FIG. 2. | 1. There is one Vender String query following one Product String query.<br>2. There is only one Get 4 Descriptor.<br>3. There are three successive Set Feature Report numbered 23 to 25 in FIG. 2. |

FIG. 3

METHOD FOR AUTOMATICALLY IDENTIFYING AN OPERATING SYSTEM FOR A USB DEVICE

BACKGROUND OF THE INVENTION

1. Field of the Invention

The present invention relates to the technical field of computer peripherals and, more particularly, to a method for automatically identifying an operating system for a universal serial bus (USB) device.

2. Description of Related Art

With the rapid development of the internet, it is a trend that a personal computer is used to get online at home. However, a person may not be familiar with the operations of a personal computer and a browser. In this case, the auto-run function of an optical disk drive or flash drive is typically used. When a compact disk is placed into the optical disk drive or the flash drive is plugged into the personal computer, the operating system performs the auto-run function to thereby activate the browser and input a special URL link. Thus, a person such as a child or an elder, who is not familiar with the operations of the personal computer and the browser, can access internet easily.

However, the antivirus software may block such an operation for the security consideration, and accordingly the aforementioned way cannot work. To overcome this, a solution uses a USB device to simulate a keyboard/mouse to thereby output a special key for activating a browser and inputting a special URL link, thereby access internet easily. However, different operating systems have the differently assigned key functions. Accordingly, when a USB device is used to simulate a keyboard/mouse, it may require different firmware for different operating systems. For example, when the "window" key and "L" key are pressed, it indicates an URL link input operation for an Apple MAC operating system and a lock operation for a Microsoft Windows operating system. Since the different operating systems have the differently assigned key functions and the USB device requires designing the different firmware based on the different operating systems, the developing cost is relatively increased. In addition, a user typically requires different USB devices with different operating systems, which further increases the cost of using USB devices and reduces the use convenience.

Therefore, it is desirable to provide an improved method for automatically identifying an operating system on a USB device to mitigate and/or obviate the aforementioned problems.

SUMMARY OF THE INVENTION

The object of the present invention is to provide a method for automatically identifying an operating system for a USB device, which can increase the use convenience on the USB device.

According to a feature of the invention, a method for automatically identifying an operating system for a universal serial bus (USB) device is provided, which further determines an operating system of a host connected to the USB device. The method includes the steps of: (A) initializing the USB device; (B) recording USB commands sent from the operating system to the USB device; (C) determining the operating system as a first operating system by the USB device when meeting a USB command condition that there are two successive USB commands of Get Product String, there is one USB command of Get Vender String, there is no USB command of Reset ahead of a USB command of Set Address command, there is no USB command of Get Language ID, or there is no USB command of Set Feature Report; and (D) determining the operating system as a second operating system by the USB device when meeting a USB command condition that there is no USB command of Get Vender String, there are two USB commands of Get Language ID and two USB commands of Get Product String, there is one USB command of Get Device Descriptor following a USB command of Get Product String command, or there is one USB command of Set Interface Report.

According to another feature of the invention, a method for automatically identifying an operating system for a universal serial bus (USB) device is provided, which further determines an operating system of a host connected to the USB device as a Microsoft Windows or Apple MAC operating system. The method includes the steps of: (A) initializing the USB device; (B) receiving a USB command of Get Device Descriptor sent from the operating system to the USB device; (C) determining whether the operating system outputs a USB command of Reset; (D) setting a flag as zero when it is determined that the operating system does not output the Reset command, and otherwise setting the flag as one; (E) recording USB commands sent from the operating system to the USB device; and (F) determining whether the operating system outputs a USB command of Set Interface Report or not, and determining the operating system as the Microsoft Windows operating system by the USB device when the operating system outputs the USB command of Set Interface Report and the flag is set as one, otherwise determining the operating system as the Apple MAC.

Other objects, advantages, and novel features of the invention will become more apparent from the following detailed description when taken in conjunction with the accompanying drawings.

BRIEF DESCRIPTION OF THE DRAWINGS

FIG. 2 shows a comparison chart of USB command differences among a Microsoft Windows, an Apple MAC and a Linux operating systems according to the invention;

FIG. 3 shows a descriptive list of USB behavior differences among a Microsoft Windows, an Apple MAC and a Linux operating systems according to the invention.

DETAILED DESCRIPTION OF THE PREFERRED EMBODIMENT

Figure 1:
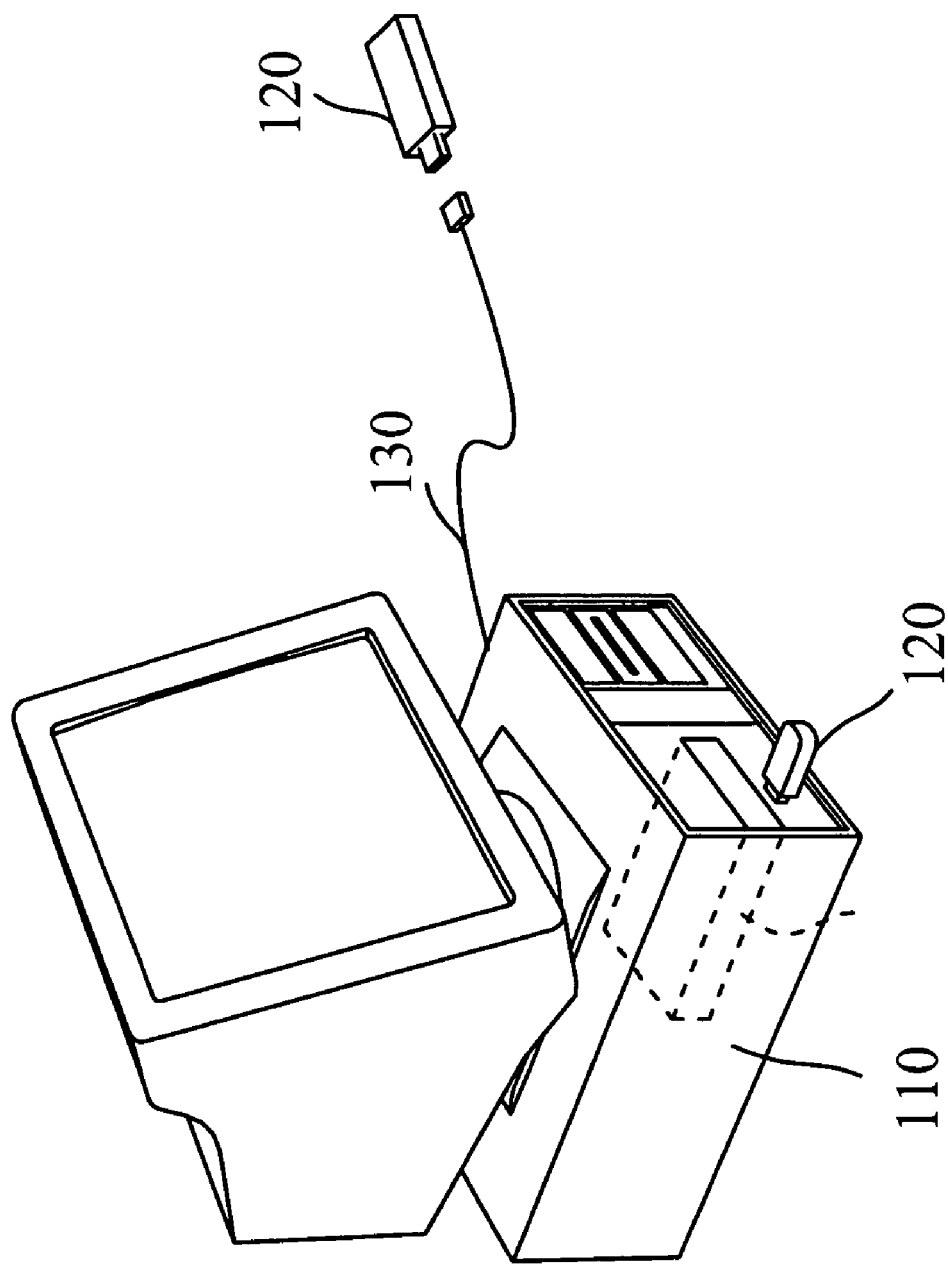
FIG. 1 is a schematic view of a configuration for automatically identifying an operating system for a USB device according to the invention.

FIG. 1 is a schematic view of a configuration for automatically identifying an operating system for a USB device according to the invention. As shown in FIG. 1, the configuration includes a host 110, a USB device 120, and a USB line 130. The USB device 120 is connected to the host 110 via a USB slot (not shown) or the USB line 130. The USB device 120 can be a USB keyboard, a USB mouse, a USB joystick, or a USB article having a descriptor table with keyboard/mouse simulation. The USB article can be declared as a keyboard/mouse device by outputting the descriptor table when the host 110 runs a device description fetch process (Get Device Descriptor). The host 110 can execute an operating system, which preferably is a Microsoft Windows, Apple MAC or Linux operating system.

When the USB device 120 is connected to the USB slot or line 130, the host 110 outputs a series of USB commands via the USB slot or line 130 in order to initialize the USB device 120. In this embodiment, the USB device 120 records the USB commands output by the operating system.

FIG. 2 shows a comparison chart of USB command differences among the Microsoft Windows, Apple MAC and Linux operating systems according to the invention. As shown in FIG. 2, during the initialization, the USB commands output by the Microsoft Windows, the Apple MAC and the Linux operating systems are partially different. Accordingly, the USB device 120 can identify the operating system of the host 110 based on the difference.

For example, the Microsoft Windows operating system can output the USB command of Set Interface Report, while the Apple MAC and the Linux operating system cannot. Therefore, the USB device 120 can accordingly determine whether the operating system is the Microsoft Windows operating system or not.

FIG. 3 shows a descriptive list of USB behavior differences among the Microsoft Windows, Apple MAC and Linux operating systems according to the invention. As shown in FIG. 3, when a USB command condition that there are two successive USB commands of Get Product String, there is one USB command of Get Vender String command, there is no USB command of Reset command ahead of a USB command of Set Address, there is no USB command of Get Language ID, or there is no USB command of Set Feature Report is met, the USB device 120 determines the operating system as the Apple MAC operating system.

When a USB command condition that there is no USB command of Get Vender String, there are two USB commands of Get Language ID and two USB commands of Get Product String, there is one USB command of Get Device Descriptor following a USB command of Get Product String, or there is one Set Interface Report is met, the USB device 120 determines the operating system as the Microsoft Windows.

When a USB command condition that there is one USB command of Get Vender String following USB command of Get Product String, there is only one USB command of Get 4 Descriptor, or there are three successive USB commands of Get Feature Report is met, the USB device 120 determines the operating system as the Linux.

Figure 4:
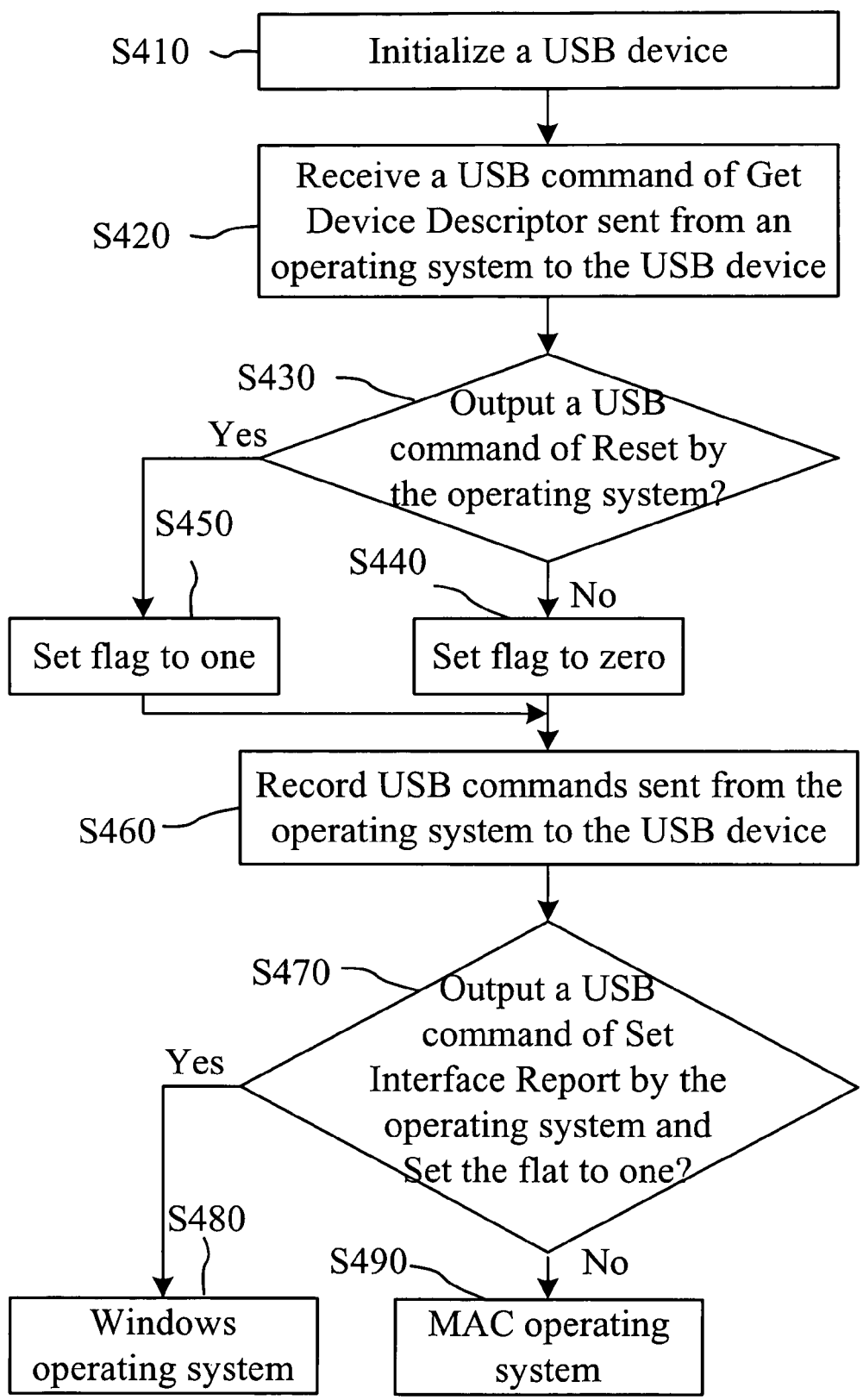
FIG. 4 is a flowchart of another embodiment of a method for automatically identifying an operating system for a USB device according to the invention.

FIG. 4 is a flowchart of another embodiment of a method for automatically identifying an operating system for a USB device according to the invention. The present invention can identify the operating system of a host 110 connected to the USB device 120 as a Microsoft Windows or Apple MAC operating system.

As shown in FIG. 4, in step S410, when the USB device 120 is connected to the USB slot or line 130, the host outputs a series of USB commands via the USB slot or line 130 in order to initialize the USB device 120.

In step S420, the USB device 120 receives a USB command of Get Device Descriptor output by the operating system. The USB device 120 is declared as a keyboard/mouse device by outputting a descriptor table with keyboard/mouse simulation.

In step S430, the USB device 120 determines whether the operating system outputs a USB command of Reset.

When it is determined that the operating system does not output the USB command of Reset, a flag is set as zero (step S440) and otherwise to one (step S450).

In step S460, USB commands sent from the operating system to the USB device are recorded.

In step S470, it is determined whether the operating system outputs a USB command of Set Interface Report. When it is determined that the operating system outputs the USB command of Set Interface Report and the flag is set as one, the USB device determines the operating system as the Microsoft Windows (step S480), and otherwise as the Apple MAC (step S490).

The method can be carried out by implementing the algorithm in a microcontroller of the USB device 120 in a firmware manner. Accordingly, the determination is complete without using any driver or taking the rebooting or hot plug. In this case, the USB device 120 can achieve the same function in different operating systems, so as to avoid any function failure caused by the different operating systems and associated input methods.

In this embodiment, the USB device 120 can determine the operating system of the host 110 and accordingly activate the functions associated with a non-Microsoft Windows operating system in a complex instruction manner. Thus, the USB device 120 can provide the same service to different operating systems, which further increases the functionality of the USB device 120. Since the prior art does not provide such a determination cited in the invention, the applications and associated drivers are necessarily implemented in a non-Windows operating system to thereby provide the multimedia. However, in the invention, no additional driver and application is necessarily implemented, and an operating system can be determined only by the firmware implemented in the microcontroller of the USB device 120. Thus, the functions associated with the operating system determined can be executed to thereby increase the device supportability and reduce the software dependence.

As cited, the method can completely overcome the problem in the prior art that the USB device 120 provides the dedicated functions only for a corresponding operating system. For example, the Microsoft Windows operating system has a hot key for browser execution, which cannot be used in the Apple MAC or Linux operating system. In addition, a smart input device can be used only in the Microsoft Windows operating system and cannot activate the same function in the Apple MAC or Linux operating system. A typical USB input device is limited to develop the firmware for a single operating system and cannot add the functions required for other operating systems. However, in the present invention, the USB device can automatically identify the used operating system and accordingly execute the corresponding functions.

In the prior art, the operations of the operating systems are different, but the required detection is not provided, so that the USB device can only provide the complete services for the input devices of some operating systems and the partial services for the other operating systems. In addition, the prior art can only use a driver to provide the same function for the different operating systems. By contrast, the invention has no driver implementation and operating system rebooting or hot plug operation. When the USB device 120 is connected to the host 110, the detection of the operating system of the host 110 is complete. For a smart input device, it can directly execute the identifiable operating systems to thereby avoid the undesired operation errors occurred when the smart input device cannot identify an operating system.

Although the present invention has been explained in relation to its preferred embodiment, it is to be understood that many other possible modifications and variations can be made without departing from the spirit and scope of the invention as hereinafter claimed.

What is claimed is:

1. A method for automatically identifying an operating system for a USB device connected to a host, comprising:

(A) initializing the USB device;

(B) recording USB commands sent from the operating system to the USB device for initializing the USB device;

(C) determining the operating system as an Apple MAC operating system by the USB device when there are two successive USB commands of Get Product String, one USB command of Get Vender String, no USB command of Reset ahead of a USB command of Set Address command, no USB command of Get Language ID, or no USB command of Set Feature Report; and (D) determining the operating system as a Microsoft Windows operating system by the USB device when there is no USB command of Get Vender String, there are two USB commands of Get Language ID and two USB commands of Get Product String, there is one USB command of Get Device Descriptor following a USB command of Get Product String command, or there is one USB command of Set Interface Report.

2. The method as claimed in claim 1, further comprising: (E) determining the operating system as a Linux operating system by the USB device when there is one USB command of Get Vender String following a USB command of Get Product String, there is only one USB command of Get 4 Descriptor, or there are three successive USB commands of Get Feature Report.

3. The method as claimed in claim 1, wherein the USB device is a USB keyboard, a USB mouse, a USB joystick, a USB article having a descriptor table with keyboard/mouse simulation, or a combination thereof.

4. A method for automatically identifying an operating system for a USB device connected to a host, so as to determine the operating system as a Microsoft Windows or Apple MAC, the method comprising the steps of:

(A) initializing the USB device;

(B) receiving a USB command of Get Device Descriptor sent from the operating system to the USB device;

(C) determining whether the operating system outputs a USB command of Reset;

(D) setting a flag as zero when it is determined that the operating system does not output the Reset command, and otherwise setting the flag as one;

(E) recording USB commands sent from the operating system to the USB device for initializing the USB device; and (F) determining whether the operating system outputs a USB command of Set Interface Report or not, and determining the operating system as the Microsoft Windows operating system by the USB device when the operating system outputs the USB command of Set Interface Report and the flat is set to one, otherwise as the Apple MAC operating system.

5. The method as claimed in claim 4, wherein the USB device is a USB keyboard, a USB mouse, a USB joystick, a USB article having a descriptor table with keyboard/mouse simulation, or a combination thereof.

* * * * *